United States Patent
Fan (10) Patent No.: US 9,059,592 B2
(45) Date of Patent: Jun. 16, 2015

(54) FIXING APPARATUS WITH WIRELESS CHARGING

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 190 days.

(21) Appl. No.: 13/932,065

(22) Filed: Jul. 1, 2013

(65) Prior Publication Data

US 2015/0002085 A1    Jan. 1, 2015

(51) Int. Cl.
*H02J 7/00* (2006.01)

(52) U.S. Cl.
CPC .................. *H02J 7/0044* (2013.01)

(58) Field of Classification Search
CPC ...... H02J 7/0042; H02J 7/0044; H02J 7/0045
USPC ................. 320/107–108, 110–115
See application file for complete search history.

(56) References Cited

U.S. PATENT DOCUMENTS

| | | | |
|---|---|---|---|
| 2005/0252598 A1* | 11/2005 | Reiss | 156/64 |
| 2007/0140924 A1* | 6/2007 | Hill | 422/124 |
| 2009/0267559 A1* | 10/2009 | Toya et al. | 320/108 |
| 2013/0257112 A1* | 10/2013 | Smith | 297/183.1 |
| 2013/0278207 A1* | 10/2013 | Yoo | 320/108 |
| 2014/0272406 A1* | 9/2014 | Yoo et al. | 428/344 |

* cited by examiner

*Primary Examiner* — Paul Dinh
(74) *Attorney, Agent, or Firm* — Lin & Associates IP, Inc.

(57) ABSTRACT

A fixing apparatus with wireless charging is provided, including a base unit, at least a stop element and a charging module. The base unit includes a placement surface, and the stop element is disposed at the base unit and protrudes above the placement surface. When an electronic device is placed upon the placement surface, the stop element is located at the edge of the electronic device to prevent from sliding off the placement surface. The charging module is disposed inside the base unit, located at a location corresponding to the placement surface. The charging module includes at least a transmitting induction coil and a control circuit unit. As such, the fixing apparatus can charge an electronic device through the charging module by electromagnetic induction when the electronic device is placed upon the fixing apparatus.

4 Claims, 8 Drawing Sheets

FIXING APPARATUS WITH WIRELESS CHARGING

FIELD OF THE INVENTION

The present invention generally relates to a fixing apparatus, and more specifically to a fixing apparatus disposed with a wireless charging module so that the fixing apparatus is able to hold an electronic device and able to charge the held electronic device wirelessly when plugged into a power source.

BACKGROUND OF THE INVENTION

As the wireless charging technology matures and the charging efficiency improves, more portable electronic devices, such as, mobile phone, personal video player, digital camera, and so on, use wireless charging. The above electronic devices use a built-in receiving induction coil electrically connected to the battery, and a wireless charging apparatus is disposed with a built-in transmitting induction coil. When the transmitting and the receiving induction coils get close, the energy can be propagated according to the electromagnetic effect and electromagnetic resonance effect. After the electricity power transformation, the battery of the electronic device can be charged.

The conventional wireless charging apparatus often includes a power cord and a wireless charging pad. The wireless charging pad is for placing a wirelessly chargeable electronic device upon, and the power cord can be plugged into a socket through the plug at the end of the power cord. As such, the charging is performed through electromagnetic effect. Although convenient, the charging often must be conducted on a flat surface, such as a desk top, or some stable places devoid of shaking or swinging. Such wireless charging apparatus is often unsuitable for a mobile phone to stand in a tilt position or charging inside a moving vehicle. Therefore, the convenience issue must be re-addressed.

SUMMARY OF THE INVENTION

The primary object of the present invention is to provide a fixing apparatus with wireless charging. The fixing apparatus includes a base unit. The base unit is able to fix the electronic device placed upon to prevent from moving. The base unit further includes a charging module inside. The charging module is able to wirelessly charge the electronic device placed upon through electromagnetic induction effect. As such, the fixing apparatus is able to perform wireless charging as long as the fixing apparatus can be used, such as, inside a vehicle, or plugging in a wall socket.

To achieve the above object, the present invention includes a base unit, at least a stop element and a charging module. The base unit includes a placement surface, and the stop element is disposed at the base unit and protrudes above the placement surface. When an electronic device is placed upon the placement surface, the stop element is located at the edge of the electronic device to prevent from sliding off the placement surface. The charging module is disposed inside the base unit, located at a location corresponding to the placement surface. The charging module includes at least a transmitting induction coil and a control circuit unit. The base unit further includes a connector, and the connector is electrically connected to the charging module.

To further enhance the holding on the electronic device, the placement surface of the base unit is disposed with a sticky anti-sliding element. The sticky anti-sliding element is made of soft material that can be adhered and detached repetitively. When the electronic device is placed upon the stick anti-sliding element of the placement surface, the stickiness and the high friction coefficient will fix the electronic device in place. Because the sticky anti-sliding element has a stickiness feature, the position of the electronic device can be adjusted freely so that the receiving induction coil inside the electronic device can be placed at a position closest to the transmitting induction coil to achieve the preferred charging result.

Furthermore, another embodiment of the present invention includes two clamping units, disposed on corresponding opposite sides of the base unit, with at least one clamping unit being movable away from or towards the other clamping unit so that the electronic device can be clamped between the two clamping units. As such, the stop element and the two clamping units will contact three sides of the electronic device to fix the position of the electronic device.

Yet another embodiment of the present invention includes two clamping units, and the two clamping units are fixed to the base unit in a guiding trench engagement manner. The stop element is also fixed to the base unit in a guiding trench engagement manner. After adjustment, the distances among the two clamping units and the stop elements will be fixed to accommodate electronic device of various sizes.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
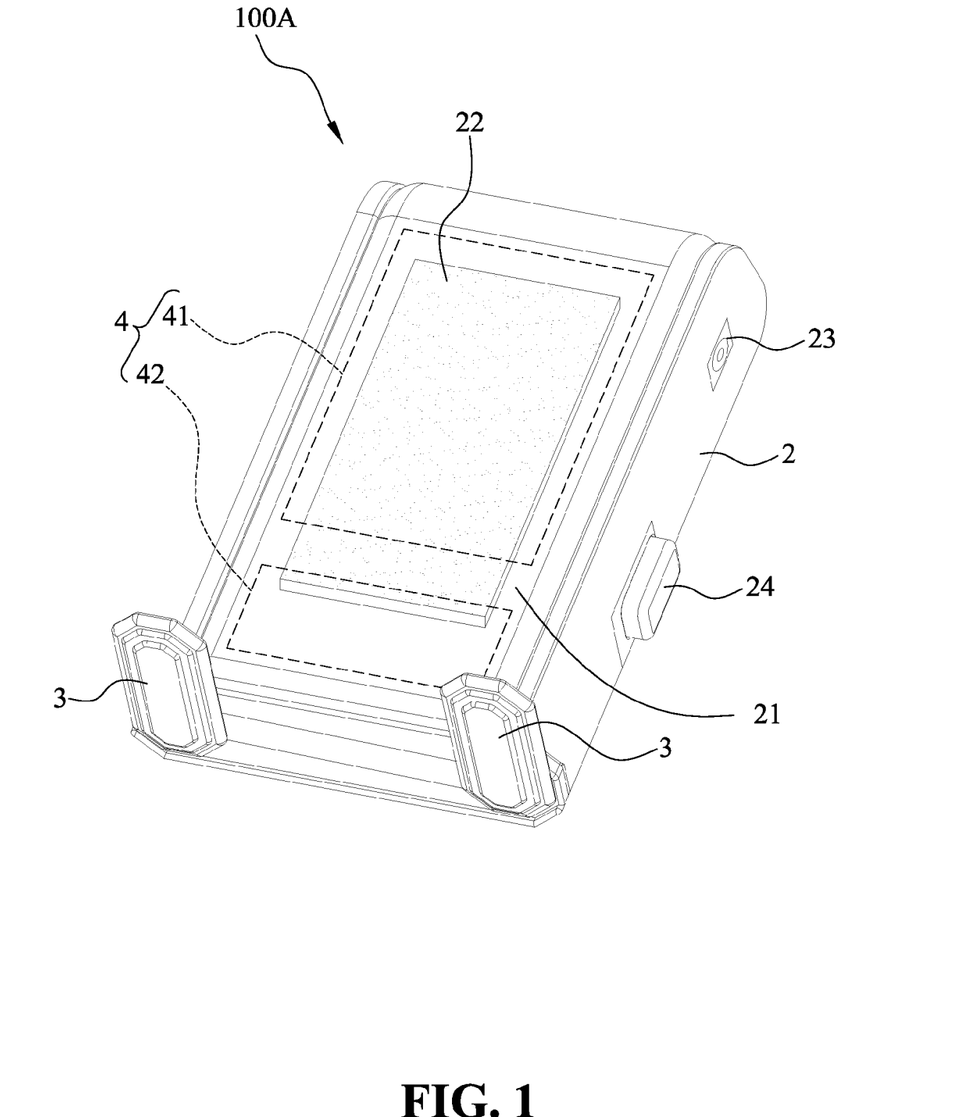
FIG. 1 shows a schematic view of the first embodiment of the present invention.

FIG. 1 shows a schematic view of the first embodiment of the present invention. A fixing apparatus 100A of the present invention includes a base unit 2, a stop element 3 and a charging module 4. The base unit 2 includes a placement surface 21, and the placement surface 21 is disposed with a sticky anti-sliding element 22. The sticky anti-sliding element 22 is made of soft material that can be adhered and detached repetitively, such as a silicone or other material. The stop element 3 is disposed at the base unit 2 and protrudes above the placement surface 21. When an electronic device is placed upon the placement surface 21, the stop element 3 is located at the edge of the electronic device to prevent from sliding off the placement surface. The sticky anti-sliding element 22 on the placement surface 21 can further fix the position of the electronic device. The charging module 4 is disposed inside the base unit 2 (shown as dash line in the FIG. 1), located at a location corresponding to the placement surface 21. The charging module 4 includes at least a transmitting induction coil 41 and a control circuit unit 42. The control circuit unit 42 is electrically connected to the transmitting induction coil 41. When in use, the power is connected to the control circuit unit 42 and the control circuit unit 42 can control the transmitting induction coil 41 to generate electromagnetic induction effect with the corresponding electronic device to perform wireless charging. The location of the transmitting induction coil 41 must correspond to the placement surface 21 and the control circuit unit 42 can be disposed in other locations inside the base unit 2 to reduce the thickness of the base unit 2. The charging module 12 can include one or more circuit boards. When there is only one circuit board, the circuit board will include both the transmitting induction coil 41 and the control circuit unit 42. In the present embodiment, the base unit 2 further includes a connector 23, and the connector 23 is electrically connected to the charging module 4 for connecting an external power cord to provide power for the charging module 4 to operate.

Figure 2:
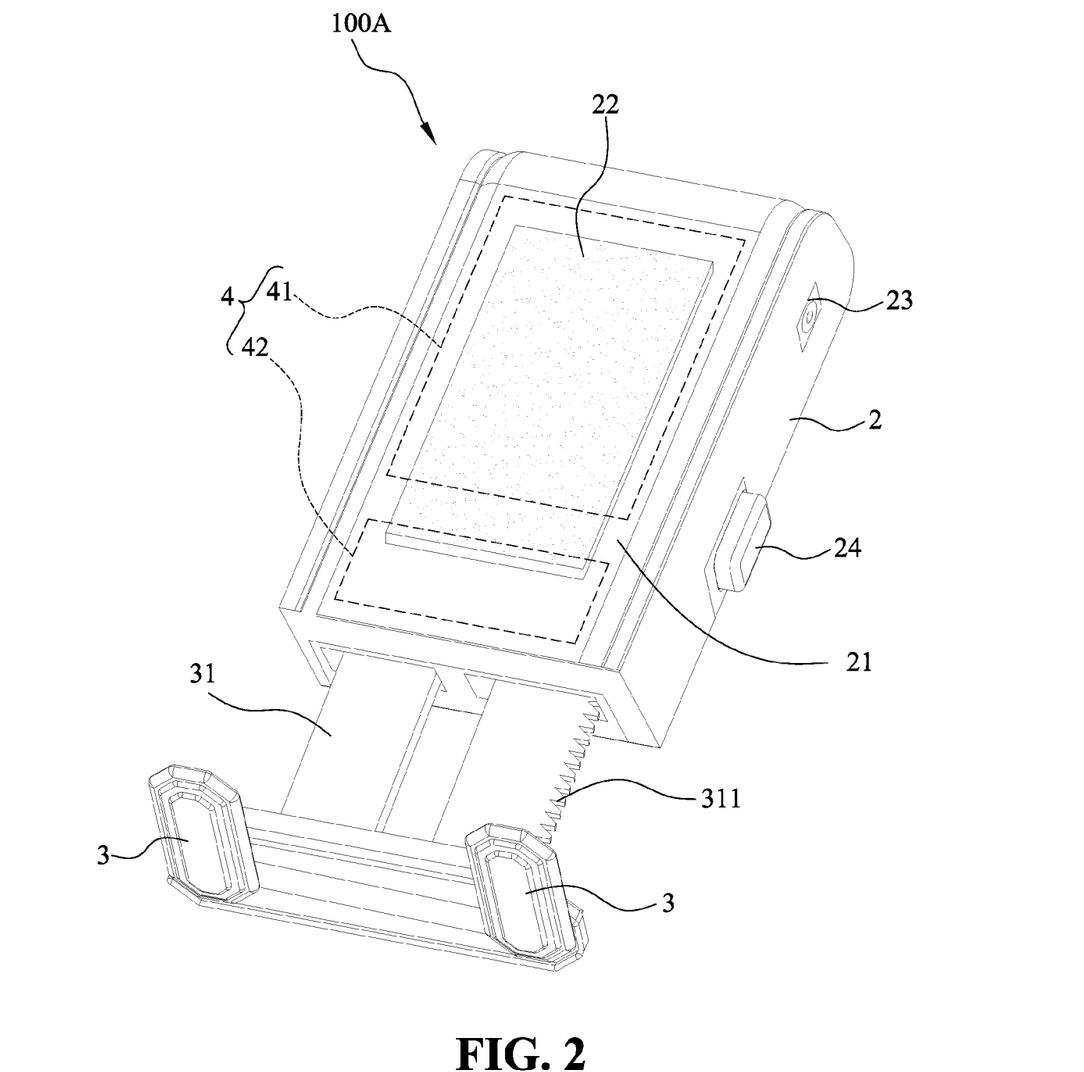
FIG. 2 shows a schematic view of the movement of the stop element of the first embodiment of the present invention.

When performing charging on the electronic device, the transmitting induction coil 41 must be close to the receiving induction coil inside the electronic device. Hence, as shown in FIG. 2, the stop element 3 in the present embodiment is a movable element. As shown in FIG. 2, the stop element 3 includes at least a sliding element 31, extending into the inside of the base unit 2, and the base unit 2 is further disposed with a locking element 24. The side wall of the sliding element 31 includes uni-directional ratchets 311. The internal structure of the locking element 24 matches the ratchets 311. The engagement manner between the ratchets and the locking element is described as in U.S. Pat. No. 6,360,083, and the details are omitted here. Only when the locking element 24 is triggered to be in an unlocked state, the stop element 3 can move away from the base unit 2.

Figure 3:
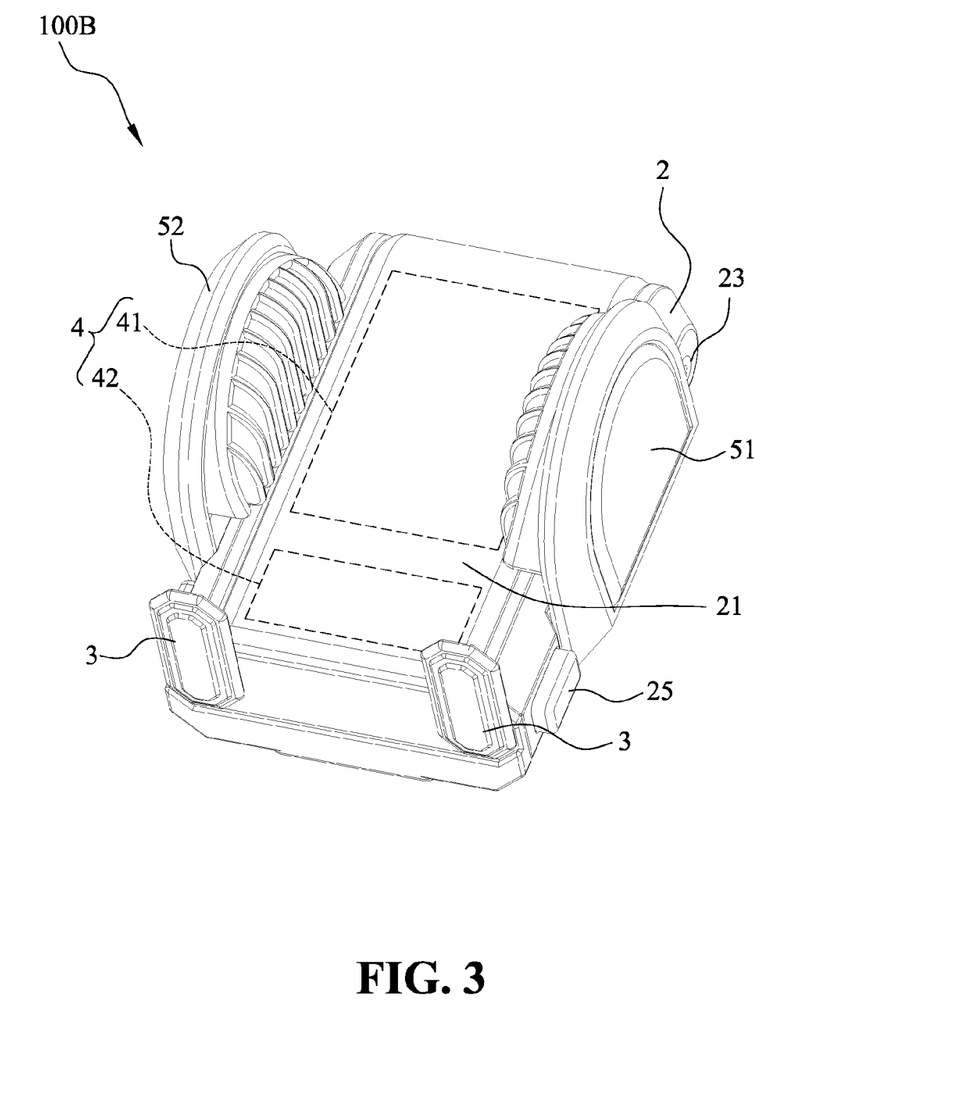
FIG. 3 shows a schematic view of the second embodiment of the present invention.
Figure 4:
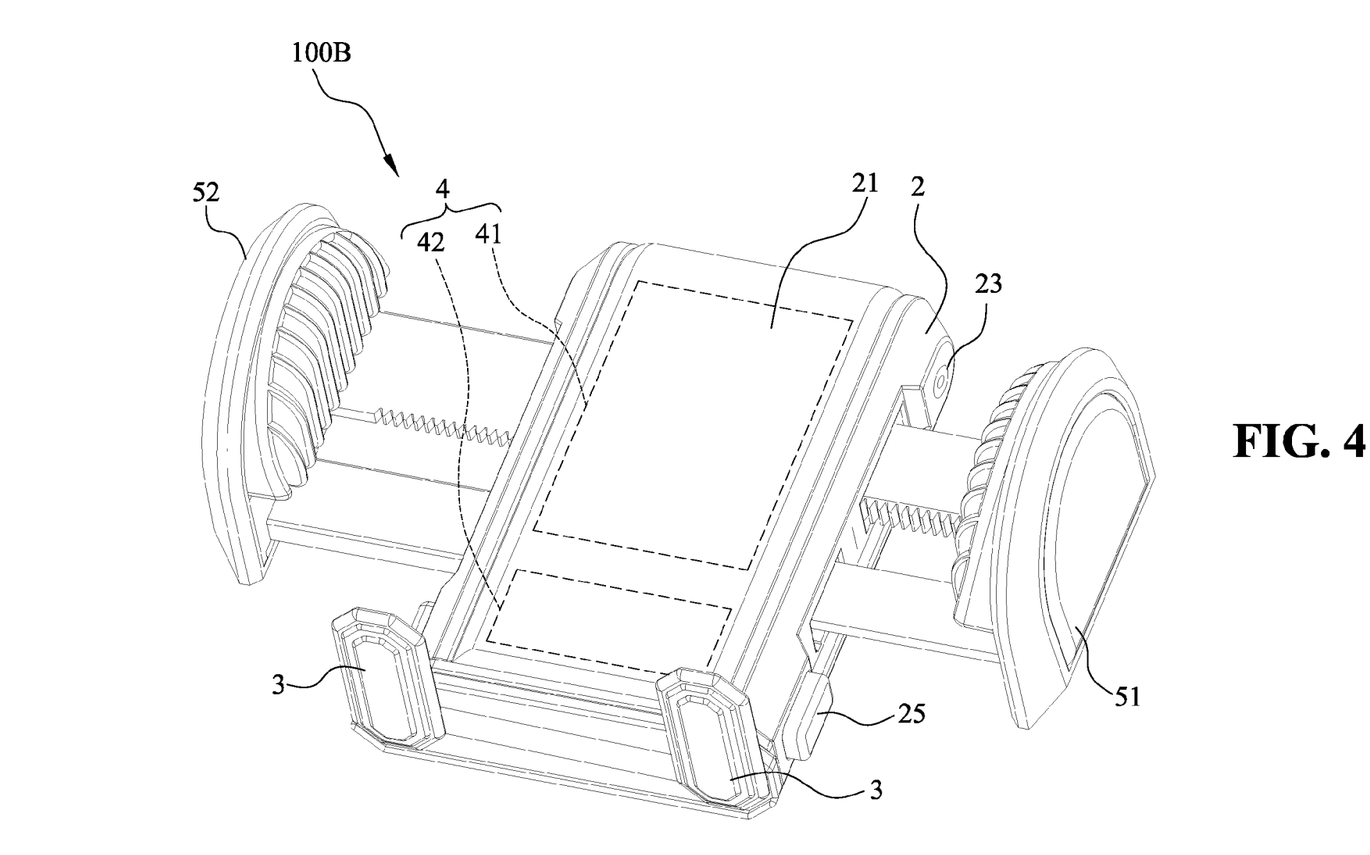
FIG. 4 shows a schematic view of the movement of the clamping units of the second embodiment of the present invention.

FIG. 3 and FIG. 4 show the second embodiment of the present invention. A fixing apparatus 100B of the present embodiment includes a base unit 2, at least a stop element 3, a charging module 4 and two clamping units 51, 52. The two clamping units 51, 52 are disposed on corresponding opposite sides of the base unit 2, with at least one clamping unit being movable away from or towards the other clamping unit. In the present embodiment, the clamping units 51, 52 can synchronously move towards or away from each other so that the electronic device can be clamped between two clamping units 51, 52. As such, the stop element 3 and the two clamping units 51, 52 will contact three sides of the electronic device to fix the position of the electronic device. Because the present embodiment uses two clamping units 51, 52 to clamp the electronic device, the placement surface 21 is not disposed with a sticky anti-sliding element.

Figure 5:
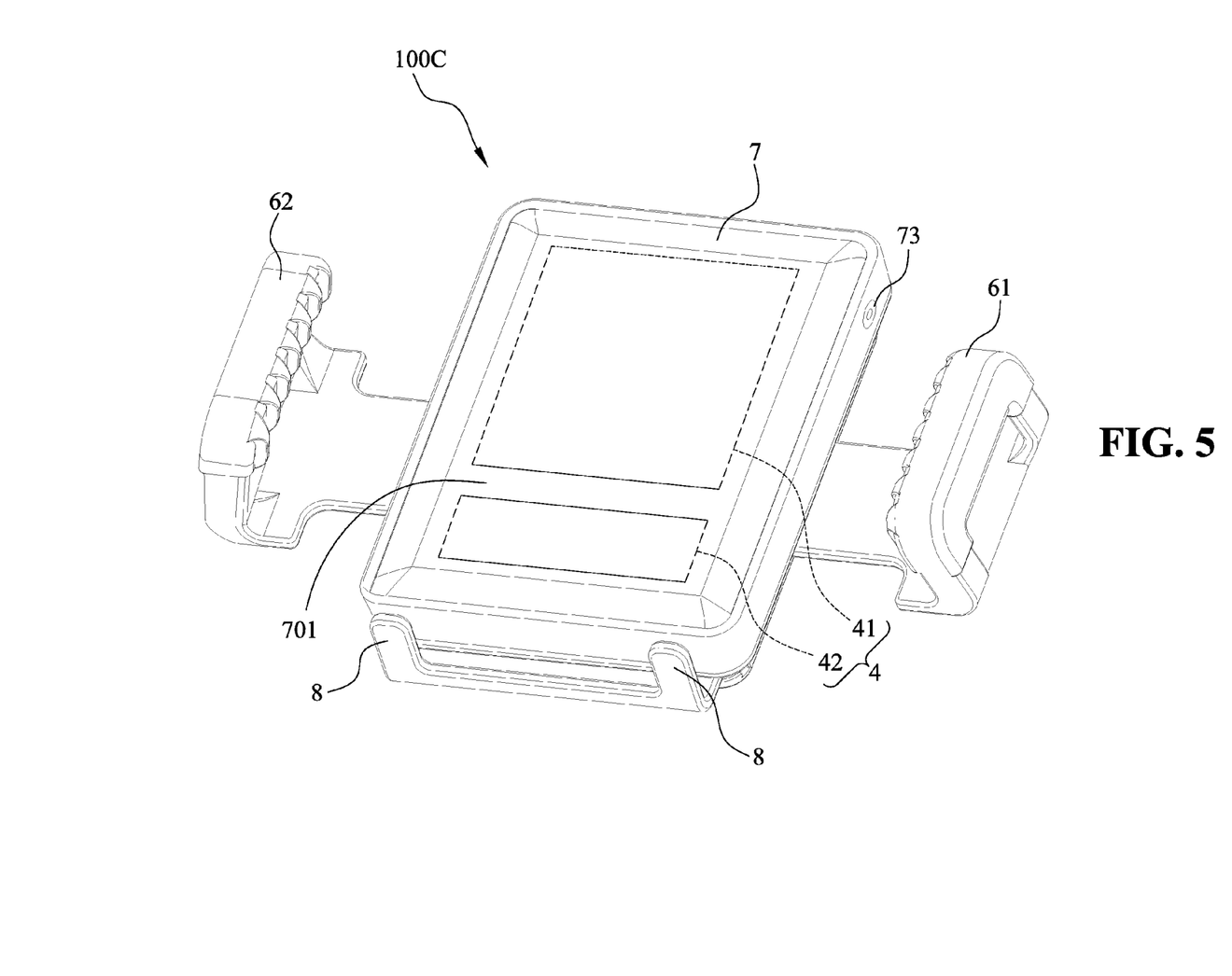
FIG. 5 shows a schematic view of the third embodiment of the present invention.
Figure 6:
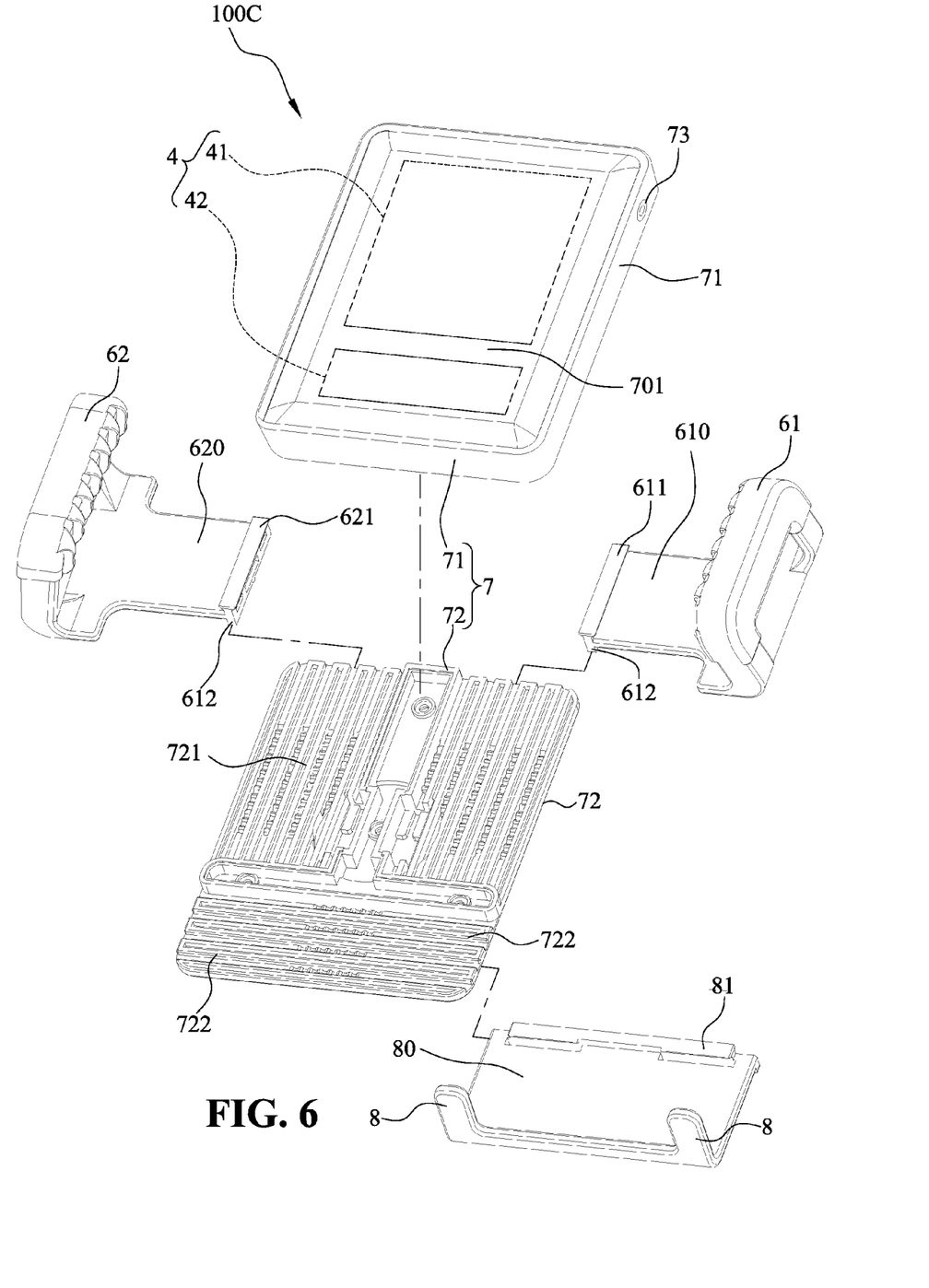
FIG. 6 shows a dissected view of the third embodiment of the present invention.

FIG. 5 and FIG. 6 show the third embodiment of the present invention. A fixing apparatus 100C of the present embodiment includes a base unit 7, a stop element 8, a charging module 4 and two clamping units 61, 62. The two clamping units 61, 62 are fixed to the base unit 7 in a guiding trench engagement manner. The inside of base unit 7 includes a plurality of clamping guiding trenches and a plurality of stopping guiding trenches, externally communicating with the outside. The direction of the clamping guiding trenches and the direction of the stopping guiding trenches are opposite, wherein the two clamping units 61, 62 can partially slide into the clamping guiding trenches. The stop element 8 can partially slide into the stopping guiding trenches. After adjustment, the distances among the two clamping units 61, 62 and the stop element 8 will be fixed to accommodate electronic device of various sizes.

Figure 7:
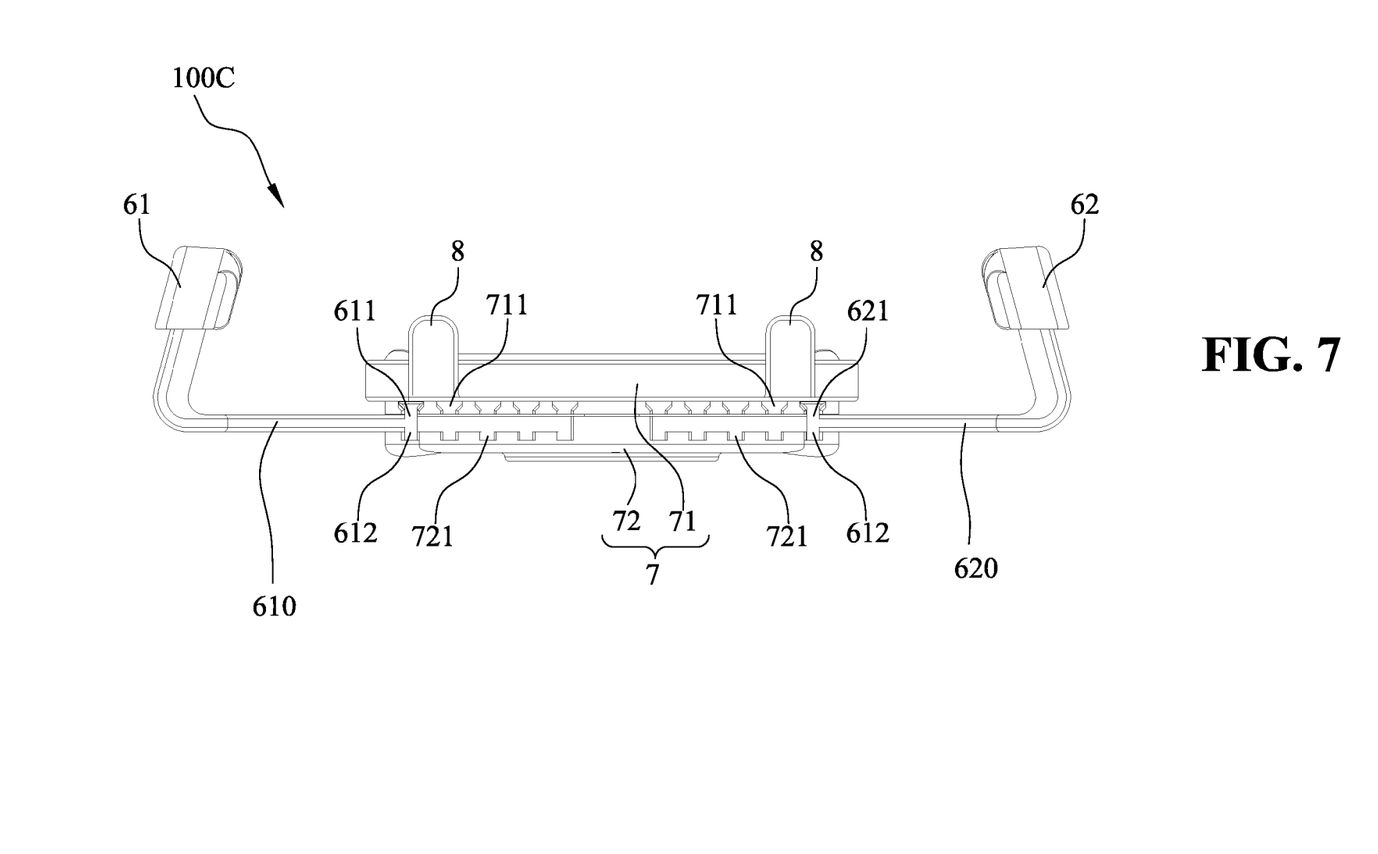
FIG. 7 shows a schematic view of the insertion location on the base unit for inserting clamping units in the third embodiment of the present invention.
Figure 8:
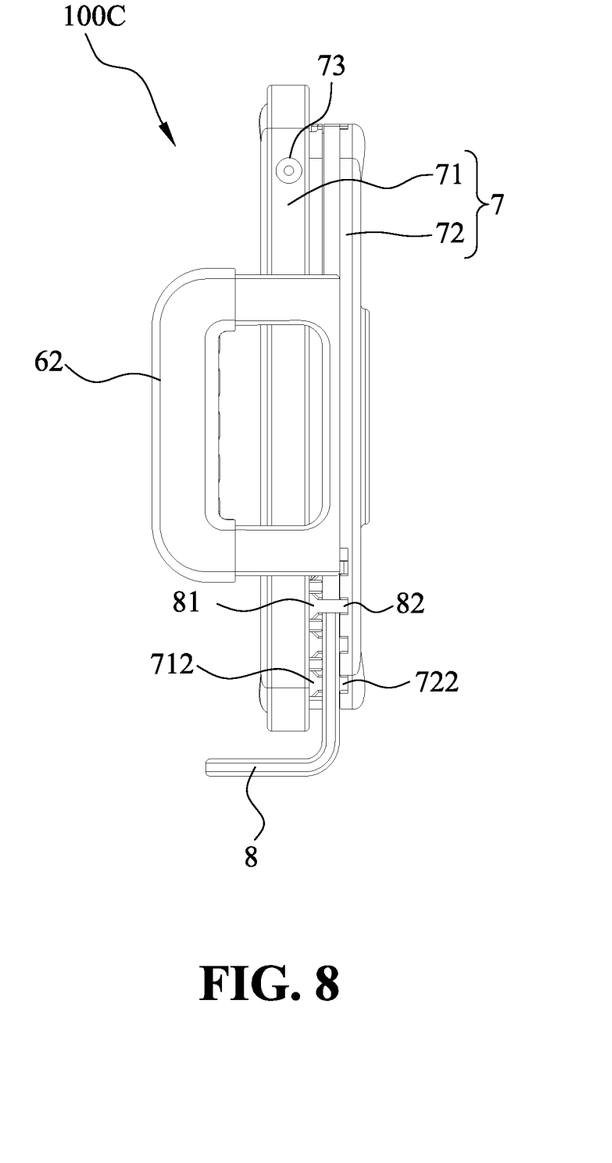
FIG. 8 shows a side view of the third embodiment of the present invention.

Because the structure for guiding trench engagement is described in U.S. Pat. No. 5,697,071, the details are omitted here. In addition, the base unit 7 includes an upper lid 71 and a lower base 72. The inner side of the upper lid 71 is disposed with a plurality of clamping guiding trenches 711 and a plurality of stopping guiding trenches 712, as shown in FIG. 7 and FIG. 8. Correspondingly, the inner side of the lower base 72 is disposed with a plurality of clamping guiding trenches 721 and a plurality of stopping guiding trenches 722. The clamping guiding trenches 711, 721 are disposed along a vertical orientation and the stopping guiding trenches 712, 722 are disposed along a horizontal orientation. The orientations of the clamping guiding trenches and the stopping guiding trenches are perpendicular, and the clamping guiding trenches and the stopping guiding trenches of the present embodiment have different shapes. The clamping unit 61 further includes an extending element 610 for inserting into the base unit 7 when assembled. One side of the extending element 610 includes an upper stuck stripe 611 and a lower stuck stripe 612 for sliding into the clamping guiding trenches 711, 721 when assembled. The clamping units 62 also includes an extending element 620, and one side of the extending element 620 includes an upper stuck stripe 621 and a lower stuck stripe 622 for sliding into the clamping guiding trenches 711, 721 when assembled. As such, the positions of the two clamping units 61, 62 are fixed. The stop element 8 further includes an extending element 80 for inserting into the base unit 7 when assembled. One side of the extending element 80 includes an upper stuck stripe 81 and a lower stuck stripe 82 for sliding into the stopping guiding trenches 712, 722 when assembled so as to fix the position of the stop element 8. As such, by sliding the two clamping units 61, 62 and the stop element 8 into guiding trenches at different positions, the positions of the two clamping units 61, 62 and the stop element 8 can be supported and adjusted.

Furthermore, the charging module 4 in the present embodiment is located inside the upper lid 71 of the base unit 7 and includes at least a transmitting induction coil 41 and a control circuit unit 42, wherein the location of the transmitting induction coil 41 must correspond to the placement surface 701 and a connector 73 is also located at the upper lid 71 to electrically connect to the charging module 4.

In summary, the present invention uses electromagnetic induction to perform wireless charging with a fix apparatus to offer convenience of holding and charging a mobile phone wirelessly at the same time.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:
1. A fixing apparatus with wireless charging, comprising:
a base unit having a placement surface and a connector;
at least one stop element disposed at the base unit and protruding above the placement surface;

a charging module disposed inside the base unit and located at a location corresponding to the placement surface, the charging module being electrically connected to the connector and further comprising at least a transmitting induction coil and a control circuit unit; and two clamping units disposed on two corresponding opposite sides of the base unit, at least one clamping unit being movable away from or towards the other clamping unit so that an electronic device can be clamped between the two clamping units for the stop element and the two clamping units to contact three sides of the electronic device to fix the position of the electronic device;

wherein when the electronic device is placed upon the placement surface, the stop element is located at an edge of the electronic device to prevent the electronic device from sliding off the placement surface.

2. The fixing apparatus with wireless charging as claimed in claim 1, wherein the placement surface is disposed with a sticky anti-sliding element, made of soft material that can be adhered and detached repetitively.

3. The fixing apparatus with wireless charging as claimed in claim 1, wherein the stop element is a movable element.

4. The fixing apparatus with wireless charging as claimed in claim 1, wherein the inside of base unit is disposed with a plurality of clamping guiding trenches and a plurality of stopping guiding trenches, externally communicating with the outside; the direction of the clamping guiding trenches and the direction of the stopping guiding trenches are perpendicular, wherein the two clamping units can partially slide into the clamping guiding trenches and the stop element can partially slide into the stopping guiding trenches; and after adjustment, the distances among the two clamping units and the stop element will be fixed for the stop element and the two clamping units to contact three sides of the electronic device to fix the position of the electronic device.

* * * * *